(No Model.)

H. A. WALKER.
WINDOW SHADE ROLLER.

No. 353,182. Patented Nov. 23, 1886.

Witnesses:
D. Hough
C. E. Jones

Inventor:
Henry Alford Walker.
per Chas. J. Gooch
Attorney.

UNITED STATES PATENT OFFICE.

HENRY ALFORD WALKER, OF LONDON, COUNTY OF MIDDLESEX, ENGLAND.

WINDOW-SHADE ROLLER.

SPECIFICATION forming part of Letters Patent No. 353,182, dated November 23, 1886.

Application filed June 28, 1884. Serial No. 136,281. (No model.) Patented in England April 9, 1883, No. 1,782.

*To all whom it may concern:*

Be it known that I, HENRY ALFORD WALKER, a subject of the Queen of Great Britain, residing at the city of London, in the county of Middlesex, in the United Kingdom of Great Britain, have invented a new and useful Improvement in Window-Blind Rollers and Parts Connected Therewith, (for which I have obtained a patent in Great Britain, No. 1,782, bearing date April 9, 1883,) of which the following is a specification.

This invention consists of a device to hold window-blinds without the use of springs or ratchet-wheels, as heretofore used, and is shown in the accompanying drawings, of which—

Figure 1:
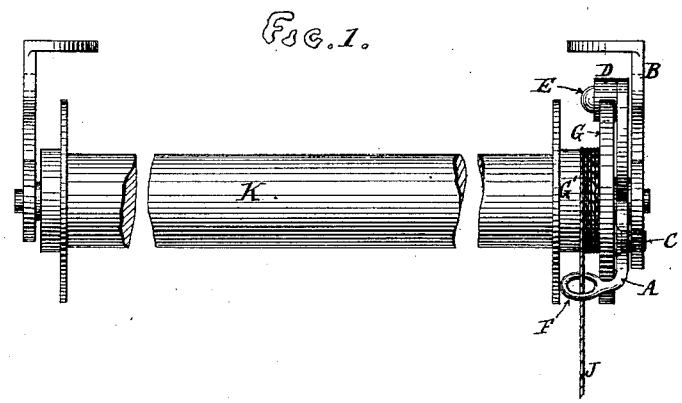
Figure 2:
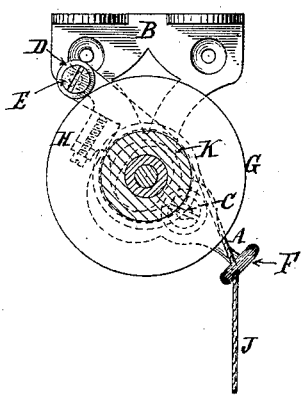
Figure 3:
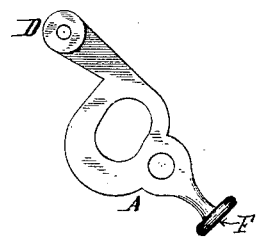

Figure 1 is a side elevation, Fig. 2 an end elevation, and Fig. 3 is a view of the lever detached.

This invention is composed of a lever, A, usually attached to the bracket B and working on a screw or pin, C. One end of the said lever is provided with a roller, D, which may be composed of leather, rubber, wood, or any other known substance for producing friction, and may be made to revolve or remain stationary on a pin, E, and which, on being released by the cord J, falls of its own weight into contact with the flange G, composing part of the spool G', and produces a friction which holds the blind at any desired position, and yet allows the blind to be drawn down by hand, the roller D revolving in frictional contact with the flange G. The bracket may be provided with a screw, H, to act as a stop for the lever A and to regulate the pressure or friction of the roller D on the flange G and allow for wear. The other end of the lever A is provided with an eye, F, through which the cord J passes for raising or lowering the blind, as desired.

The bracket B may be placed in any required position; but in all cases the friction-lever A must be arranged on the bracket B or otherwise, so that the friction-roller D on the end of the lever A will fall into frictional contact with the flange of the spool G'.

The pin C, on which the frictional lever A works, and the friction-roller D, when in working position, are a little to one side or eccentric to the axis of the roller K, about one-eighth of an inch, (more or less,) in order to cause the requisite friction to hold the blind in any desired position.

The roller K may be arranged to work in brackets B, of any desired design, and the brackets can be attached to the vertical portion of the window-frame or to the top of the frame, if desired.

By preference the lever A is so arranged to the brackets B that the frictional roller D is made to act by gravitation on the top portion of the frictional flange G, as shown in Fig. 2. However, if required, the lever A may be placed in other relative positions to the friction-flange G—that is to say, the lever A may be attached to the bracket so as to cause the frictional roller D to work on any desired part of the periphery of the friction-flange G.

The improvement is also applicable to maps, plans, and other similar purposes when placed on rollers.

I am aware that it has been proposed to provide a shade-roller with a friction-pad and a brake-lever through which the cord passes; but I am not aware of any device other than mine having a friction-roller, a brake-lever for operating the same, and means for adjusting the frictional pressure of the pad and compensating for the wear of the parts in frictional contact.

Having now described the mode of making and working my invention, what I claim as new, and desire to secure by Letters Patent, is—

The combination, with a blind or other roller, K, and cord J, of the spool G', having flange G, lever A, friction-roller D, bracket B, and adjustable stop H, for regulating the movement of said lever A, adjusting the frictional pressure upon the flange G of the roller D, and compensating for the wear of the parts in frictional contact, substantially as set forth.

HENRY ALFORD WALKER.

Witnesses:
CHAS. A. ALLISON,
HARRY A. McLELLAN.